US006612331B2

(12) United States Patent
Cederstav et al.

(10) Patent No.: US 6,612,331 B2
(45) Date of Patent: Sep. 2, 2003

(54) PRESSURE CONTROLLER AND METHOD

(76) Inventors: Per Cederstav, 9215 Brown Deer Rd., Suite A, San Diego, CA (US) 92121; Sean Mallory, 9215 Brown Deer Rd., Suite A, San Diego, CA (US) 92121; Emmanuel Vyers, 9215 Brown Deer Rd., Suite A, San Diego, CA (US) 92121; William Ballard, 9215 Brown Deer Rd., Suite A, San Diego, CA (US) 92121; David Kruse, 9215 Brown Deer Rd., Suite A, San Diego, CA (US) 92121

( * ) Notice: Subject to any disclaimer, the term of this patent is extended or adjusted under 35 U.S.C. 154(b) by 0 days.

(21) Appl. No.: 10/052,757

(22) Filed: Jan. 18, 2002

(65) Prior Publication Data
US 2002/0109115 A1 Aug. 15, 2002

Related U.S. Application Data

(62) Division of application No. 09/738,194, filed on Dec. 15, 2000.

(51) Int. Cl.[7] .............................. F16K 31/04; G05D 7/06
(52) U.S. Cl. .............................. 137/487.5; 137/625.64; 251/129.04; 700/282
(58) Field of Search ........................ 137/487.5, 625.62, 137/625.64; 251/129.04; 700/282, 21

(56) References Cited

U.S. PATENT DOCUMENTS

| 3,586,027 | A | * | 6/1971 | Fitzgerald et al. | ........ 137/487.5 |
| 4,621,789 | A | * | 11/1986 | Fukamachi | ................ 185/40 R |
| 4,791,954 | A | | 12/1988 | Hasegawa | ................ 137/487.5 |
| 4,845,416 | A | * | 7/1989 | Scholl et al. | .......... 251/129.04 |
| 4,926,903 | A | * | 5/1990 | Kawai | .................... 251/129.04 |
| 4,930,746 | A | | 6/1990 | Reinicke et al. | ........ 251/129.11 |
| 4,938,118 | A | * | 7/1990 | Wolfges et al. | ........ 137/625.64 |
| 5,137,257 | A | * | 8/1992 | Tice | ....................... 251/129.04 |
| 5,228,645 | A | * | 7/1993 | Reinicke | ................. 251/129.04 |
| 5,279,481 | A | | 1/1994 | Trotter et al. | ................ 244/136 |
| 5,452,735 | A | * | 9/1995 | Gamble et al. | ................. 137/1 |
| 5,598,814 | A | * | 2/1997 | Schroeder et al. | ........ 123/90.11 |
| 5,884,894 | A | * | 3/1999 | Smith | ..................... 137/625.64 |
| 6,148,837 | A | * | 11/2000 | Irokawa et al. | ........ 251/129.04 |
| 6,157,888 | A | * | 12/2000 | Suzio et al. | ........... 251/129.04 |
| 6,279,870 | B1 | * | 8/2001 | Welz et al. | ............. 251/129.04 |

FOREIGN PATENT DOCUMENTS

DE           871729   U    11/1987

* cited by examiner

Primary Examiner—Michael Powell Buiz
Assistant Examiner—Ramesh Krishnamurthy
(74) Attorney, Agent, or Firm—Steins & Associates, P.C.

(57) ABSTRACT

A closed loop pressure controller system that sets, measures and controls the process pressure within a semiconductor process is shown. The system is commonly composed of a pressure sensor to collect the pressure information, a controller box that hosts the control electronics, and a valve to physically affect the conductivity of the inlet or outlet gas line and accordingly the process pressure. The present invention differs from the prior art by using closed-loop motor control of the valve, rather than the method of the prior art, where the valve position is controlled by a stepper motor actuator driven in an open loop fashion. It is demonstrated that the utility of such prior art open-loop configurations is limited by the fact that the achievable precision of the valve position is hindered by static friction in the valve system, and the non-linear character of the torque versus shaft-angle of the motor (among other error components). The method of the present invention more accurately positions the valve, and accordingly enhances the overall precision and allowable loop-gain of the pressure control system by providing the valve drive with feedback as to the actual angular position of the valve in extremely high resolution.

7 Claims, 10 Drawing Sheets

PRESSURE CONTROLLER AND METHOD

This is a division of application Ser. No. 09/738,194 filed Dec. 15, 2000.

BACKGROUND OF THE INVENTION

1. Field of the Invention

This invention relates generally to automated pressure control and, more specifically, to an Improved Pressure Controller and Method.

2. Description of Related Art

The term, "semiconductor processing equipment," refers to a seemingly infinite variety of large, highly expensive pieces of machinery that are used to conduct a variety of different processes that ultimately result in a completed semiconductor device. What is a common design aspect for many pieces of semiconductor processing equipment is the need for accurate, fast and reliable pressure control of the vacuum within the chamber where the process is taking place. If we look at FIG. 1, we can review how a conventional semiconductor processing tool system 10 is arranged today.

FIG. 1 is a depiction of a conventional semiconductor processing tool system 10. As shown in FIG. 1, the processing tool 12 is typically supplied by gas that is transmitted from a gas supply 14 (such as the bottle shown) through a gas supply line 16 until it gets to the vicinity of (or inside of) the semiconductor processing tool 12, where the actual flow of the gas to the chamber is controlled by a mass flow controller 18. In this way, the tool 12 can regulate when and how much gas to inject into the processing chamber 20.

There is generally a chamber pressure sensor 22 that provides an external signal via the pressure signal conduit 34. This external pressure signal typically can be either analog or digital in form, and represents the pressure conditions within the chamber 20. The signals are carried by a pressure signal conduit 34 to a conventional pressure control means 30. Within the pressure control means 30, the pressure signal is generally summed with a host tool logic signal later referred to as host tool pressure setpoint. The host tool pressure setpoint is generally generated by the tool logic controller 32, with its content being an analog or digital pressure setpoint value. These tool logic signals are transmitted to the pressure control means 30 by a tool logic signal conduit 36.

If we refer back to the tool 12, we can also see that another important feature that is many times found within the tool 12 is a plasma generator unit 23. This feature is important since plasma generators create sudden and sometimes large pressure deviations. Plasma generators essentially energize the gas molecules which splits them into ionized atoms and species. These ionized species are much more reactive than their molecular "parents" thus greatly speeding up and increasing the selectivity of processes such as etch and deposition. The instant the plasma is turned on, a fraction of the gas molecules split in to pieces thereby producing instant undesirable increases in chamber pressure. Similarly, the supply lines 16 (and the gas they transmit) also have an effect on the pressure within the chamber 20. The chamber 20 is generally kept in a vacuum state in order to prevent impurities from contaminating the semiconductor process. The conventional arrangement for maintaining the vacuum condition in the chamber 20 is via a vacuum source 24, such as the vacuum pump 24 shown. The vacuum pump 24 simply pumps to an exhaust 25 while drawing a vacuum on a vacuum transmission line 26. Between the vacuum source 24 and the vacuum transmission line 26 is found a valve 28. It is by actuation of this valve 28 that the pressure can be raised and lowered (usually in the sub-atmospheric range) within the chamber 20.

Once the pressure signal and tool logic signal are summed in the pressure control means 30, the resulting signal is sent to a motor driver circuit 42 via an external valve command conduit 38. This conduit 38 is either hard wired via conventional cable, printed circuit board trace, or wire, however, it could also be wireless. The motor driver circuit 42 is actually a sub-component of a valve control assembly 40. The other components of the valve control assembly 40 are an internal valve command conduit 44 and a motor/valve drive assembly means 46 for actuating the valve 28. As should be appreciated, the signals generated by the pressure control means 30 are acted upon by the valve control assembly 40 to open and close the valve 28 such that the pressure in the chamber 20 is regulated. As described above, the pressure control system is influenced by external factors called states of the process, in particular, the turning on and off of gas inputs to the chamber and the initiation of RF events to create plasma are primary contributing factors. The pressure control algorithm (executed by the Pressure Control Means 30) constantly works at maintaining the pressure regulated at the required value by actuating the valve in order to compensate and balance the pressure responsive to the changing states of the process. It is clear that the pressure regulation task can be performed only as well as the individual elements comprising the closed loop system permit. As such the valve control assembly (40) is an essential component in terms of its accuracy and speed of response to maintain quality and/or stability of the control system. If we now turn to FIG. 2, we can look more closely at the valve control assembly 40 of the conventional system.

FIG. 2 depicts a conventional valve control assembly 40. As can be seen, the resultant signal of the summed commands from the pressure control means 30 in FIG. 1 arrive at the motor driver circuit 42 via an external valve command conduit 38. As discussed above, this is typically a cable that is run for whatever length necessary to extend between the pressure control means 30 and the motor driver circuit 42. Between the motor driver circuit 42 and the motor/valve drive assembly means 46 is an internal valve command conduit 44. In the conventional system, this conduit, too, is an external cable running between the motor driver circuit 42 and the motor/valve drive assembly means 46. The motor/valve drive assembly means 46 conventionally comprises a motor drive 48 such as a conventional stepper motor, which in turn drives a required reduction gear, or other means of mechanical advantage 52 via a motor shaft 50. In other forms, the motor drive 48 is connected to a valve stem 54 via belts and pulleys. In any case, it is conventional in the art that there not be a direct connection or coupling between the motor drive 48 and the valve means 28 without some method of mechanical advantage or reduction gearing having the effect of increasing the number of revolutions of the motor drive 48 needed to create a full open to close cycle of the valve means 28. This mechanical advantage typically also has the beneficial effect of increasing the step resolution as many folds as the reduction factor of the mechanical reducer means. However, it also represents an actuation speed penalty of the same magnitude, as the motor has to travel farther for the same valve displacement. Additionally, the increased resolution is partially absorbed and degraded by the inherent nonlinearity (backlash) introduced by the mechanical reducer means. That actuation speed handicap has proved to be more detrimental to the quality of the pressure control dynamic characteristics and transient response performance than initially expected. A further note is that within the conventional internal valve command conduit 44, there is typically one single unidirectional path that extends from the motor driver circuit 42 to the motor drive 48 with the exception of two limit switches that are normally used within the motor valve drive assembly to reference the open and closed valve positions. These switches return a binary logic signal that cannot resolve position continuously across the stroke of the valve but only at two discrete locations—in order to distinguish these limit-switch-generated signals from signals to be discussed later on in connection with FIG. 4, we shall refer to these signals as "stroke reference feedback signals." We will refer to this path as the command leg 56. The command leg 56, again, is unidirectional (excluding the stroke reference feedback signals), and only extends from the motor driver circuit 42 to the motor drive 48, and not vice versa If we now turn to FIG. 3, we can examine how the conventional chamber pressure control process 300 operates.

We will start with the host tool pressure setpoint signal 302 arriving at the pressure control means 30. The pressure control means further comprises summing junction means 31 for the pressure sensor signal 314 to be compared with the host tool pressure setpoint signal 302 and generate a pressure error signal 304. That error signal is operated on by a pressure control algorithm 303 to produce a pressure control signal 306 that represents the desired change in valve position intended to correct said pressure error. If the system incorporates a conventional step motor drive, the pressure control signal 306 is transmitted from pressure control means 30 to the motor driver circuit 42 where it is converted to a position control signal 310. This signal 310 is then transmitted to the motor drive assembly means 46. Valve motion 312 is generated by actuating the valve stem 54. The valve stem 54 accordingly opens or closes the valve means 28 which, in turn, reduces or increases the conductance of the vacuum transmission line 26. This will respectively result in an increase or decrease in pressure within the processing chamber 20—a quantity that is continuously monitored by the pressure sensor 22. The monitored pressure is used to generate a pressure sensor signal 314 which is fed back to and again compared with the host tool pressure setpoint 302 by the summing junction 31. This above defined closed loop will herein be referred to as the pressure control loop. In practice the implementation of the pressure control loop is executed with electronics incorporating both discrete and continuous signals and is repeated in an iterative fashion.

As can be seen here, the vacuum transmission line 26, the processing chamber 20 and the chamber pressure signal 316 are all depicted in dashed lines; this is to highlight the fact that the position of the valve is not the only condition to affect the chamber pressure. Because of numerous external factors such as the turning on and off of gas inputs to the chamber and the initiation of RF events, the stability of the process is often challenged or disturbed. The efficiency with which these disturbances can be handled or rejected is substantially dependent on the accuracy with which the valve drive means can be rapidly and efficiently operated. In that context the remaining portion of this application will be devoted to illustrating the advantage of a system that provides nested closed-loop position control of the motor drive assembly means 46 by the motor drive circuit means 42. This is implemented specifically to minimize the chamber pressure sensitivity to process variations and better exploit the pressure feedback information thus enhancing the pressure control performance.

SUMMARY OF THE INVENTION

In light of the aforementioned issues and fundamental shortcomings associated with the prior systems and methods, it is an object that the present invention provide a method that allows for greater quality and accuracy of control resulting in both faster times to setpoint and better steady state pressure stability. The preferred invention will rely on an enhanced valve control scheme that integrates a valve position servo control system nested within the conventional pressure control loop. In other words, it is a further object that the pressure control function be accomplished by generating a pressure control signal in terms of valve position. That control signal would in turn be transformed into an actual valve position by a valve/motor drive feedback system. In contrast with prior art systems that make use of open loop motor control, closed loop motor control brings an overwhelming advantage to the pressure control function. One further object is to utilize the higher-resolution addressability of motion that allows for a conventional motor to be directly linked to the valve stem without a geared reducer thus enabling the valve to operate at a faster speed, and to further provide the improved positional precision that is achievable by closed loop operation. It is a still further object that the improved system relieve the pressure control function of the design constraints of low valve speed and limited accuracy of valve positioning.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Pressure Controller and Method. The present invention can best be understood by initial consideration of FIG. 4.

Figure 1:
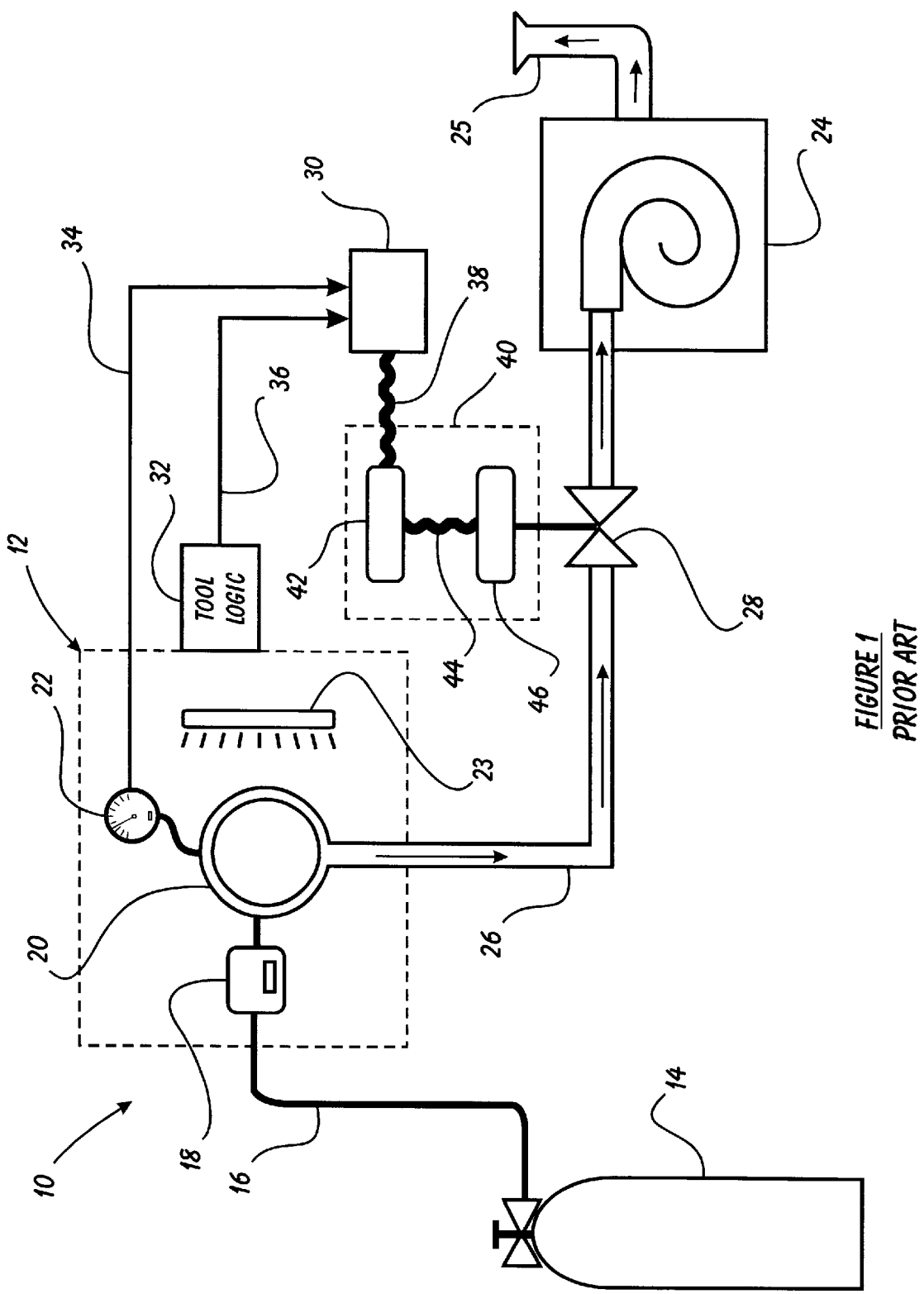
FIG. 1 is a depiction of a conventional semiconductor processing tool system.
Figure 2:
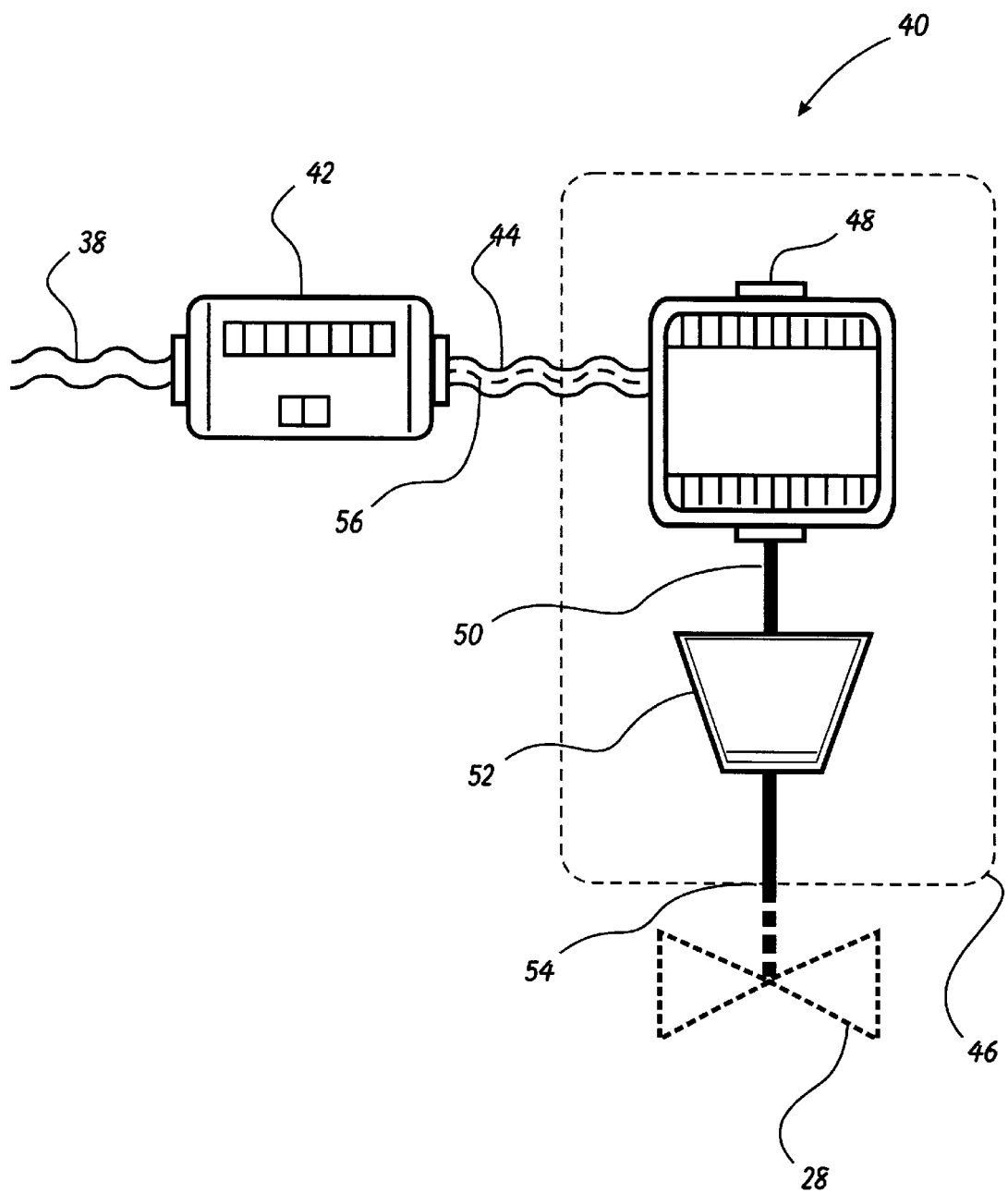
FIG. 2 depicts a conventional valve control assembly.
Figure 3:
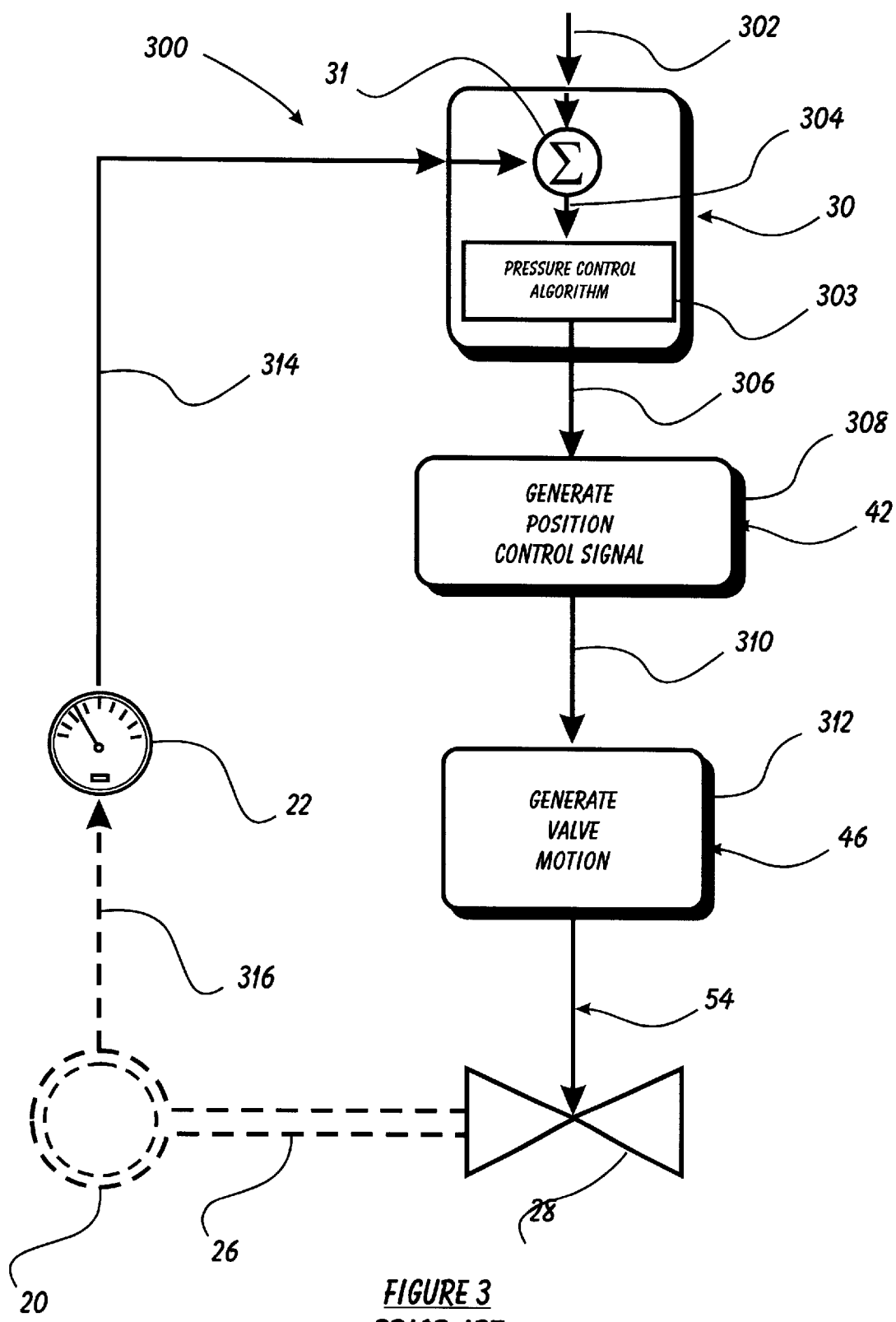
FIG. 3 is a flow chart depicting a conventional chamber pressure control process in which only a closed-loop pressure control system is used.
Figure 4:
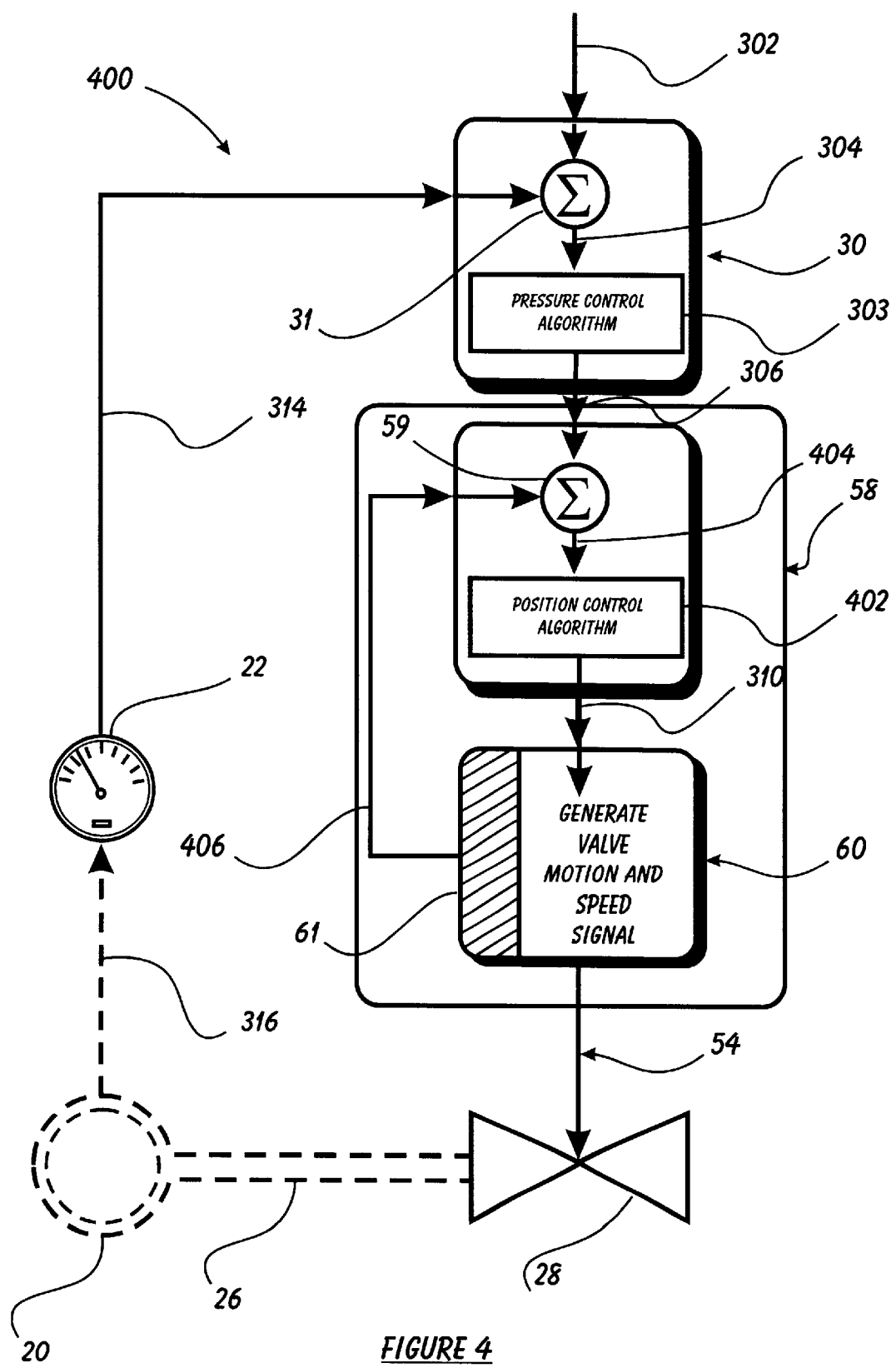
FIG. 4 is the improved chamber pressure control process of the present invention in which both a closed-loop pressure control system and a closed-loop position control system are used.

FIG. 4 is a depiction of the improved chamber pressure control process 400 of the present invention. Similar to the system displayed in FIG. 3 a position setpoint signal is generated by comparing host tool pressure setpoint signal 302 and pressure sensor signal 314 within pressure control means 30. Said position setpoint signal 306 is then transmitted to an improved closed loop valve drive means 58. Therein, summing junction means 59 then sums the position setpoint signal 306 with a motor position feedback signal 406 to generate a position error signal 404. That error signal is operated on by the position control algorithm 402 to produce a motor control signal 310 intended to correct said position error. The signal 310 is then transmitted to the improved motor drive assembly means 60. The unproved motor drive assembly means 60 then generates both a valve motion action which is transmitted by the valve stem 54, and a motor position feedback signal 406. The feedback signal 406 is then generated and transmitted by the motor position feedback generator means 61 to the summing junction means 59 within the improved closed loop valve drive means 58. It should be appreciated that by permitting the valve drive 58 to have direct feedback regarding the position of the valve means 28, there is a substantial improvement in the ability to apply closed loop pressure control methods to drive the assembly means 60. To be more specific, compared with the prior art, the invention is eliminating the effects of coulomb friction, hysteresis and external torques on position accuracy by the proper design of the position control algorithm 402. Next, the effect of backlash such as is characteristic in gear-driven systems are also compensated for. Therefore, the improved valve drive is by its enhanced accuracy of response enabling the design and implementation of a more effective pressure control algorithm 303. Essentially, valve position errors that would previously filter out in the pressure control loop are corrected at the source by the position control loop.

An example of the substantial benefits of this system is provided below in FIG. 9. If we now turn to FIG. 5, we can examine more detail about the improved valve control assembly 62 of the present invention.

Figure 5:
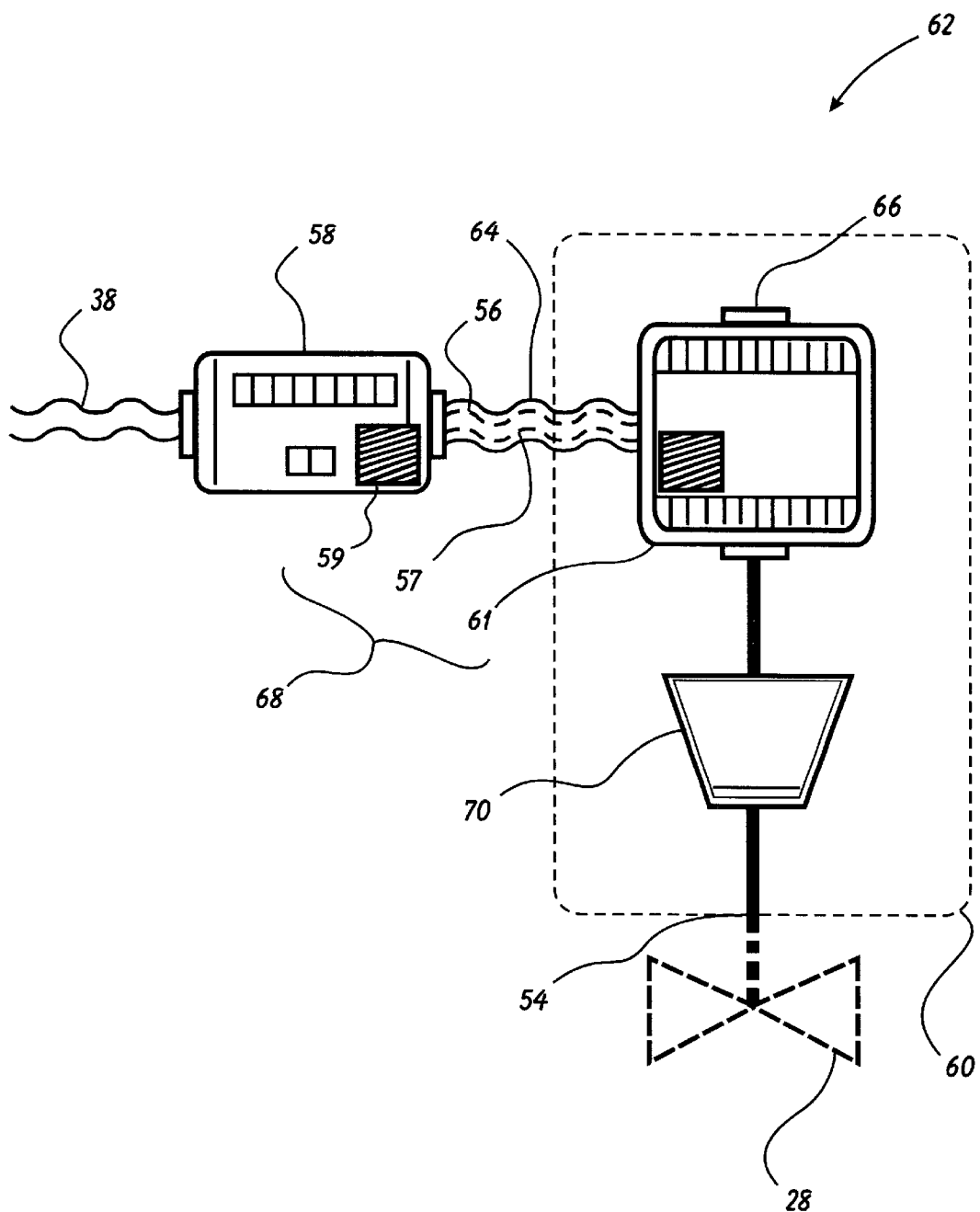
FIG. 5 depicts the improved valve control assembly of the present invention.

FIG. 5 depicts the improved valve control assembly 62 of the present invention. One substantial distinction is that the improved internal valve command conduit 64 not only comprises a command leg 56 for signals being transmitted from the improved closed-loop valve drive means 58 to the improved motor drive 66, but it further includes a feedback leg 57 going in the opposite direction. Furthermore, within the improved motor drive 66 there is found a feedback signal generator means 61 for transmitting these position feedback signals and the feedback leg 57 to summing junction means 59 within the improved closed-loop valve drive means 58. The combination of the summing junction means 59, the feedback leg 57 and the feedback signal generator means 61 is referred to as a valve/motor drive feedback system 68. In this example, the improved drive assembly means 60 is shown as having reduction gear means 70 incorporated within it. It should be understood, however, that since the system of the present invention really makes possible positive addressable position of the valve means 28 with a high degree of accuracy, a conventional stepper motor can then be used to directly drive the valve stem 54, without the need for the reduction gear 70. It should further be understood that when we discuss feedback signals emanating from the feedback signal generator means 61, we refer to them as "valve position feedback signals," to be contrasted with the earlier-described "stroke reference feedback signals," the difference being that the stroke reference feedback signals are simply endpoint reference signals, whereas the valve position feedback signals of the present invention are signals that indicate the actual positioning of the improved motor drive 66 over the entire range of stroke of the valve.

Extending from the reduction gear means 70 (if included, as here) is the conventional valve stem 54 to operate the valve means 28 in response to the improved direction/speed signals received by the improved motor drive 66. If we now turn to FIG. 6, we can examine how the system of the present invention would operate as a part of the conventional semiconductor processing tool system.

Figure 6:
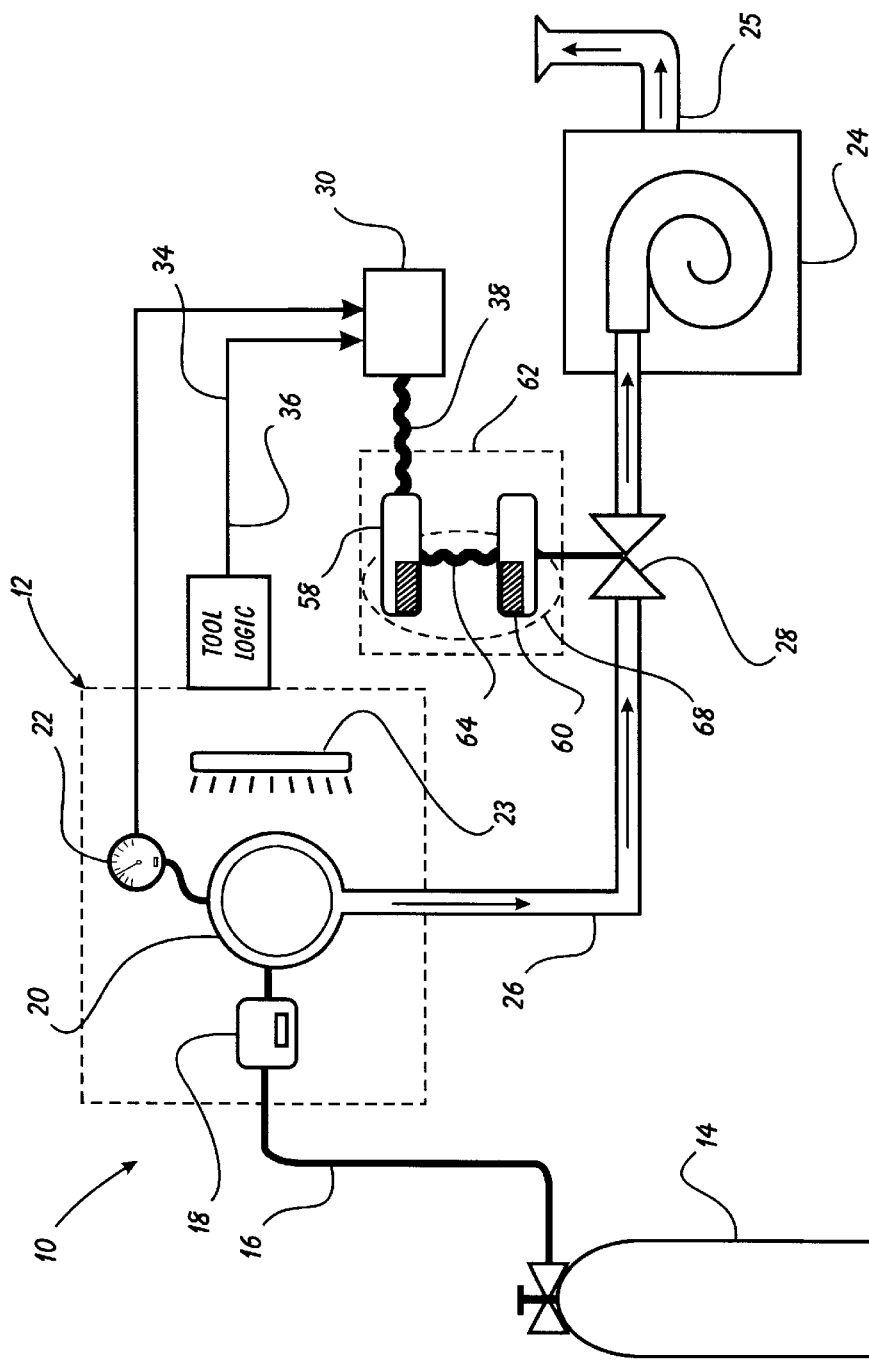
FIG. 6 depicts a semiconductor processing tool system having the embodiment of the present invention of FIGS. 4 and 5 incorporated within it.

FIG. 6 depicts a semiconductor processing tool system 10 having the embodiment of the present invention of FIGS. 4 and 5 incorporated within it. As shown in FIG. 6, we can see how the improved valve control assembly 62 essentially fits within the system 10 without any modification. In fact since the valve control assembly 62 has an internal motor closed-loop control system, it has been demonstrated that the assembly 62 can be installed in-situ on a valve means 28 that it was not originally designed to operate. If we now turn to FIG. 7, we can see just how this feedback signal is created at its elemental level.

Figure 7:
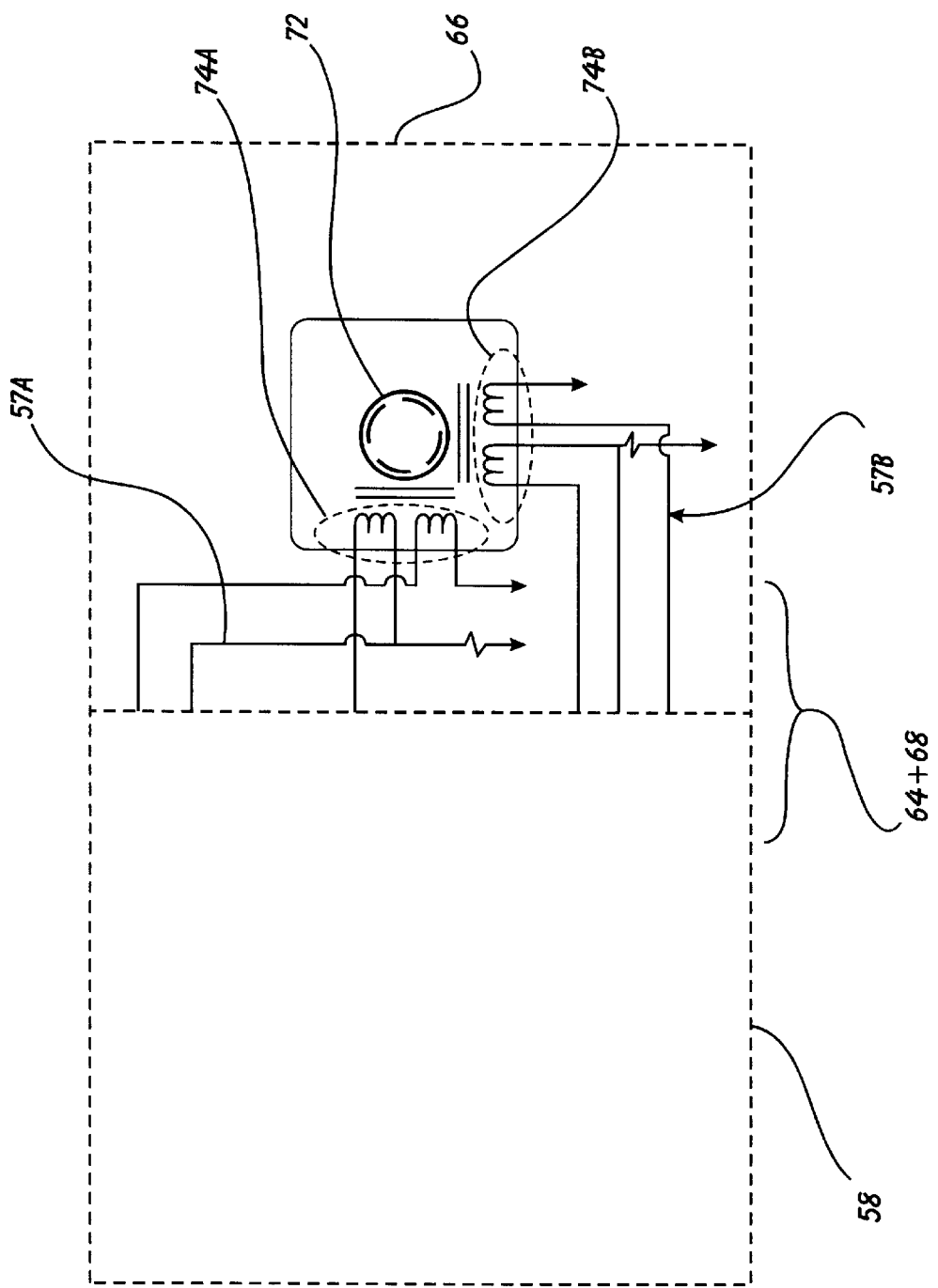
FIG. 7 is a partial schematic of the improved valve control assembly of FIGS. 4 through 6.

FIG. 7 is a partial schematic of the improved valve control assembly 62 of FIGS. 4 through 6. Feedback signals are those back EMF pulses that are generated when the rotor 72 of a motor is moved. In this improved control assembly 62, the conventional two-phase stepper motor is slightly modified so that one coil each of the phase A coils 74A and the phase B coils 74B is used to drive the rotor 72 while at the same time the second coil in the phase A coils 74A and the phase B coils 74B feeds a feedback leg 57A and 57B, respectively. As such, rather than power being applied to the feedback legs 57A and 57B, power is actually drawn off or generated by the movements of the rotor 72. The operation of this back EMF is well explained in U.S. Pat. Nos. 5,134,349, 5,202,613 and 5,321,342. The difference between these prior patents and present invention is that the conventional back EMF motion control has here been used to control a valve stem for pressure control, an application where it has never before been used, and from which unexpected performance results are obtained.

Continuing to describe FIG. 6, the motor drive 66 then interfaces with the internal valve command conduit 64 and the valve/drive feedback system 68 in order to get inputs from and provide feedback to the closed-loop valve drive means 58. It should be understood that the closed-loop valve drive means 58 could be provided by the combination of specialty integrated circuit devices and processors, or in its preferred form, it will be incorporated within a digital signal processing device ("DSP") wherein all of the control and feedback is handled by software. In this way, the internal valve command conduit is actually incorporated within the same housing as the valve drive means 58 and the motor drive 66. If we now turn to FIGS. 8A and 8B, we can see how these alternative embodiments might look.

Figure 8A:
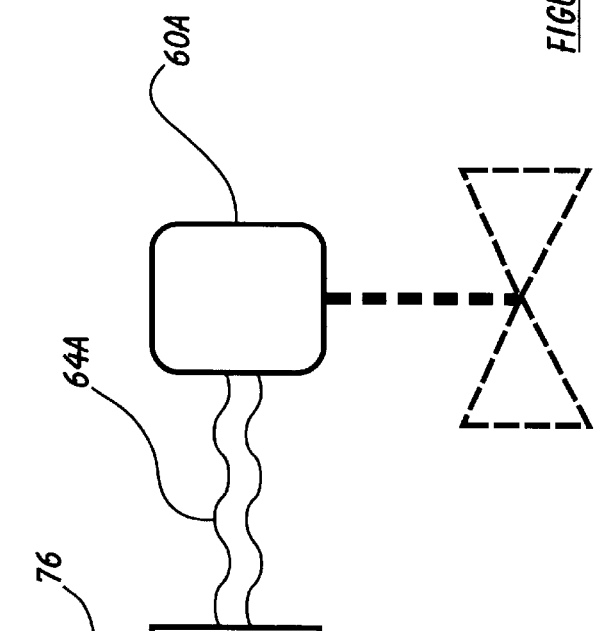
FIGS. 8A and 8B are alternate embodiments of the improved valve control assembly of the present invention.
Figure 8B:
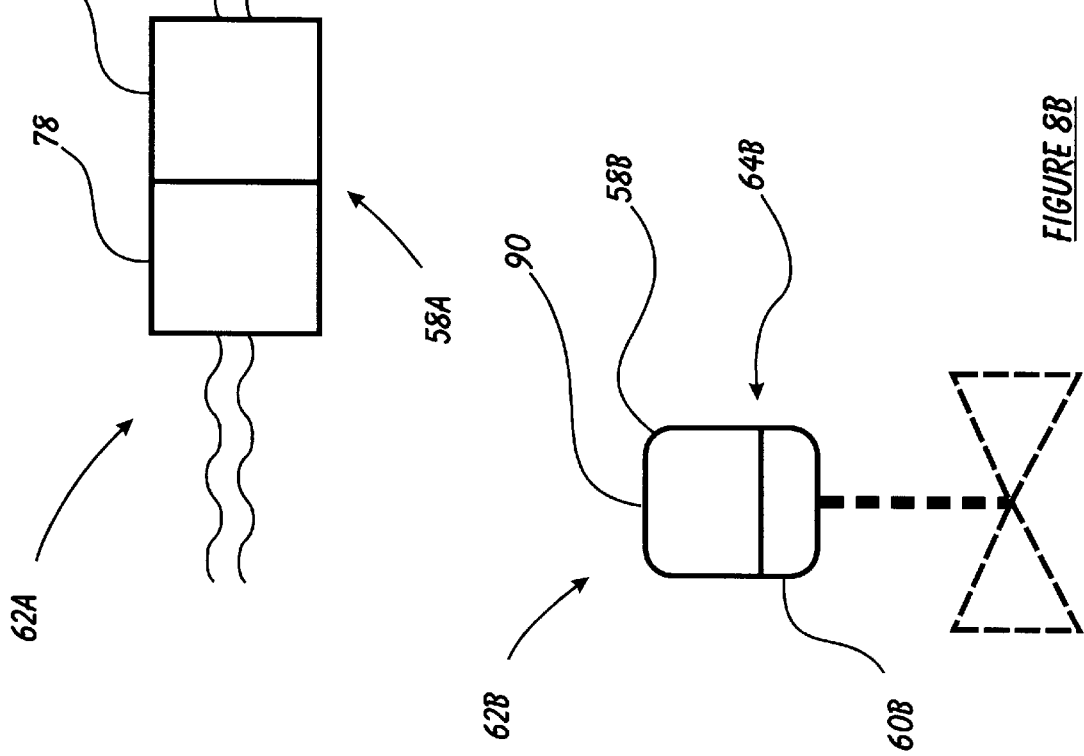

FIGS. 8A and 8B are alternate embodiments of the improved valve control assembly 62 of the present invention. As shown in FIG. 8A, this embodiment of the valve control assembly 62A has a processor device 78 and the ASIC 76 incorporated within a single housing as the closed-loop motor driver circuit 58A. These are then connected by the cable-type internal valve command conduit 64A to the drive assembly means 60A. In contrast, and as shown in FIG. 8B, this alternative embodiment of the valve control assembly 62B has the closed-loop motor driver circuit 58B and the drive assembly means 60B incorporated within a single housing 90. It should be understood that the housing 90 might actually be two separate enclosures that are immediately adjacent to one another such that the internal valve command conduit 64B is essentially eliminated. The benefit of eliminating the external cable is that all EMI effects (which are typically prevalent within a conventional semiconductor processing facility) are eliminated in the control scheme of the valve. This further improves the performance of the pressure control system. If we now turn to FIG. 9, we can see just how beneficial the results are as compared to the conventional valve control systems.

Figure 9:
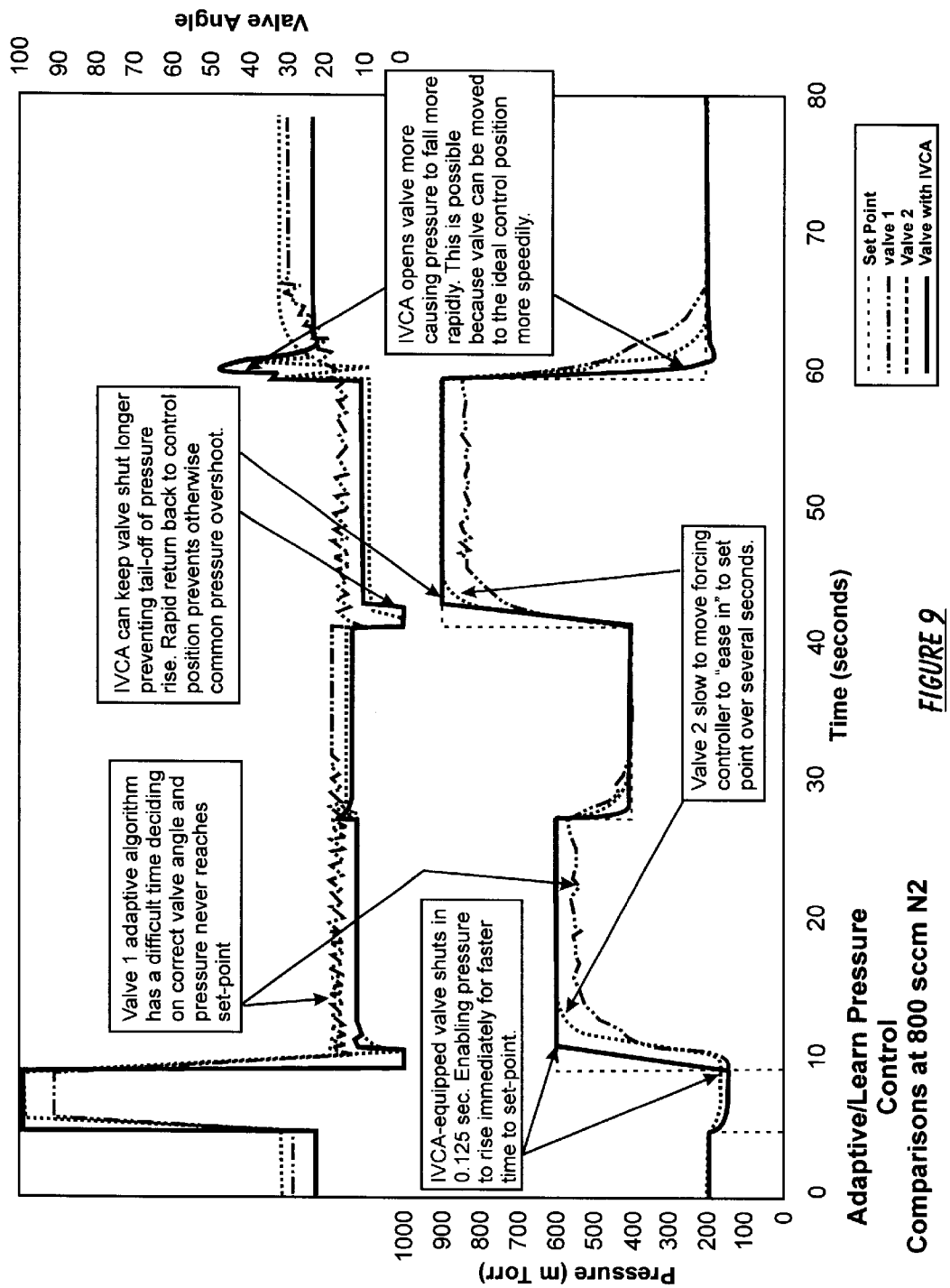
FIG. 9 is a graph showing the improved performance demonstrated by the system of the present invention over the prior art.

FIG. 9 is a graph showing an example of improved performance demonstrated by the system of the present invention over the prior art. As can be seen by the valve angle shown at the top half of the chart, the valve with the improved valve control assembly of the present invention demonstrates the steepest response curve in response to a signal. It is believed that this is principally related to improvements in valve speed of operation and valve position angular accuracy brought about by the invention. As can be seen from the chamber pressure curve, none of the conventional valve arrangements come as close to the set-point pressure as the valve with the improved valve control assembly of the present invention. In fact, and as shown below in Table I, in this series of experiments the valve with the improved control assembly of the present invention is nearly 11 seconds faster (approximately 15%) than its closest conventional competitor.

TABLE I

RESPONSE TIME COMPARISON

| Step # | Setpoint | Valve with IVCA | Valve 1 | Valve 2 |
|---|---|---|---|---|
| 1 | 9.0 sec | 10.7 | Setpoint not reached | 13.7 |
| 2 | 27.2 sec | 27.9 | 31.6 | 30.5 |
| 3 | 41.1 sec | 42.8 | Setpoint not reached | 44.4 |
| 4 | 59.4 sec | 62.1 | 66.3 | 65.5 |
| □[Time(Valve) − Setpoint] = | | 6.8 sec | Non-computable | 17.4 sec |

Figure 10:
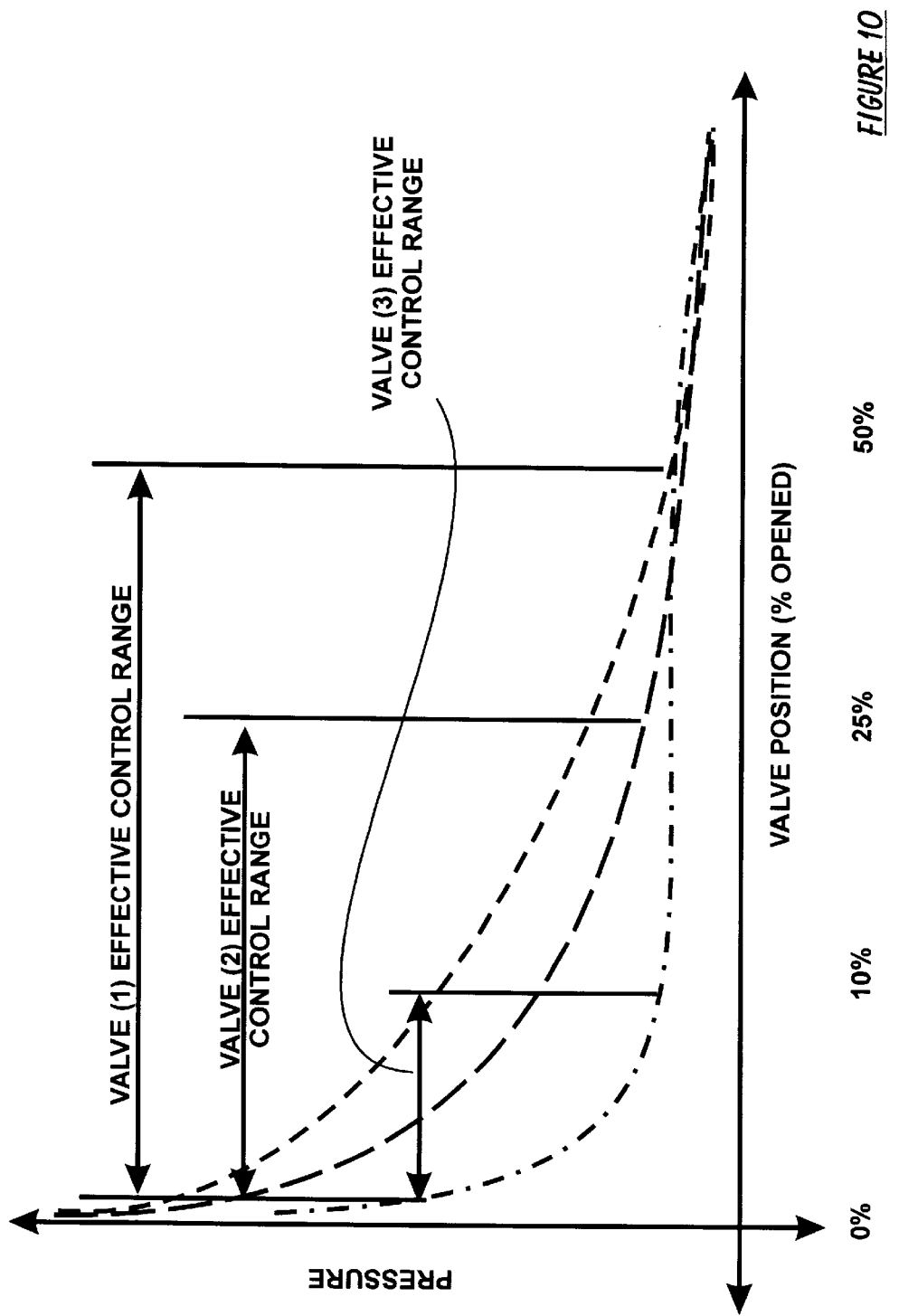
FIG. 10 is a graph showing the valve conductance curves for three different species of valves.

Finally, turning to FIG. 10, we can examine a substantial benefit provided by the present invention. FIG. 10 depicts the pressure response curves of three conventional species of valves. Each valve species has a different profile for its pressure response to valve movement. In this case, Valve (1), a conventional small-sized throttling butterfly valve, has a fairly gradual slope over much of its position settings. Since the slope is so gradual, the effective control range extends from nearly zero percent up to approximately fifty percent. This wide of an effective control range is fairly simple for even a conventional motor drive controller. When we look at the steeper response curves of Valve (2) (a conventional medium-sized throttling butterfly valve) and Valve (3) (a conventional large-sized throttling butterfly valve or any size sealing throttling valve such as poppet, gate or pendulum types), we can see that the effective control ranges are much smaller than for Valve (1). These narrow control ranges mean that the highest resolution valve positioning is necessary; if there is not enough granularity in the valve positioning system, the motor drive will simply not be able to control at a setpoint, but will instead oscillate above and below the desired pressure. In the closed-loop valve control assembly of the present invention, an effective resolution ranging from 100,000 to 8,000,000 motor positions (from 0% to 100% valve position) has been demonstrated, this is sufficient to provide good pressure control performance even in the steepest valve response curves. In contrast, the conventional open-loop valve control assemblies cannot actually tell where the valve is positioned, but only where it should be positioned. As a result of the effects of friction, backlash, and other previously-described effects, the resulting valve positioning error makes using high resolution control ineffective (since the small angular steps many times will be inadequate to overcome the positioning error). Consequently, the conventional valve control assembly will typically only provide in the range of 1,600 to 12,000 motor steps between 0% and 100% valve position. Since there is such a low resolution these prior open-loop valve control assemblies may not even be capable of effectively operating a valve having the profile of Valve (3).

It should further be understood that while all of the previous examples provided herein have involved the operation of a valve located downstream of the process chamber to control the pressure in the process chamber ("downstream pressure control"), that other configurations are certainly included within the present method and system. Namely, the use of a closed-loop valve control assembly located upstream of the process chamber to control the pressure within the chamber ("upstream pressure control"). Furthermore, the method and system of the present invention could be applied in combination with a valve and the signal from a fluid flow meter (in contrast to the signal from a pressure sensor) in order to regulate fluid flow (i.e. gas or liquid) in a conduit; again, the same improved results are expected. It should also be understood that improvements to valve position control speed and accuracy can also be realized by the use of feedback mechanisms and methods other than back EMF pulses. Examples of such methods may include, but are not limited to, the use of potentiometers and motor encoders. The degree to which these alternative methods are effective for improving valve actuation performance may depend on the resolution with which these feedback mechanisms can be employed.

Those skilled in the art will appreciate that various adaptations and modifications of the above-described preferred embodiment can be configured without departing from the scope and spirit of the invention. Therefore, it is to be understood that, within the scope of the appended claims, the invention may be practiced other than as specifically described herein.

What is claimed is:

1. A valve and control assembly, comprising:

a valve defined by a valve stem;

a motor drive operatively connected to said valve stem, said motor drive further comprising:

a motor defined by an rotatable axle, said axle positionable in angular positions; and a feedback signal generator means for generating motor feedback signals comprising data representing said angular position of said motor; and a motor driver circuit means for generating motor control signals, said motor control signals being generated responsive to position error signals, said position error signals generated responsive to said feedback signals and valve position setpoint signals, said position error signals being unresponsive to a rate of change of said data representing said angular position of said motor.

2. The assembly of claim 1, wherein said feedback signal generator means generates a continuous said motor position feedback signal.

3. The assembly of claim 2, wherein said feedback signal generator means generates an analog motor position feedback signal.

4. The assembly of claim 2, wherein:

said motor generates back EMF signals responsive to said angular position of said axle; and said feedback signal generator means generates said feedback signals responsive to said EMF signals.

5. An apparatus for positioning a valve stem, comprising:

a pressure control means for generating valve position setpoint signals;

a motor operatively connected to the valve stem, said motor rotatable through angular positions;

a motor position feedback generator for generating motor position feedback signals comprising data representing said angular positions of said motor;

motor driver circuit means for generating position error signals and motor control signals, said position error signals responsive to said valve position setpoint signals and said data representing said angular positions, said position error signals further unresponsive to a difference between subsequent said motor position feedback signals.

6. The apparatus of claim 5, wherein said motor position feedback generator generates a continuous said motor position feedback signal.

7. The apparatus of claim 6, wherein said motor position feedback generator generates a motor position feedback signal responsive to back EMF detected from said motor.

* * * * *

UNITED STATES PATENT AND TRADEMARK OFFICE
CERTIFICATE OF CORRECTION

PATENT NO. : 6,612,331 B2 Page 1 of 1
DATED : September 2, 2003
INVENTOR(S) : Per Cederstav et al.

It is certified that error appears in the above-identified patent and that said Letters Patent is hereby corrected as shown below:

Title page,
Item [73], Assignee, should read -- Nor-Cal Products, Inc., Yreka, CA (US) --.

Signed and Sealed this

Sixth Day of September, 2005

JON W. DUDAS
*Director of the United States Patent and Trademark Office*